May 17, 1966     C. O. CROKER     3,251,371

WALKING AID FOR THE SIGHTLESS

Filed June 2, 1964     3 Sheets-Sheet 1

INVENTOR.
CHARLES ORMOND CROKER
BY
Oberlin, Maky & Donnelly
ATTORNEYS

May 17, 1966  C. O. CROKER  3,251,371
WALKING AID FOR THE SIGHTLESS
Filed June 2, 1964  3 Sheets-Sheet 3

INVENTOR.
CHARLES ORMOND CROKER
BY
Oberlin, Maky & Donnelly
ATTORNEYS

United States Patent Office 3,251,371
Patented May 17, 1966

3,251,371
WALKING AID FOR THE SIGHTLESS
Charles Ormond Croker, Essendon, Victoria, Australia, assignor to Margaret McCall Shepherd
Filed June 2, 1964, Ser. No. 371,919
Claims priority, application Australia, June 4, 1963, 31,499/63
9 Claims. (Cl. 135—47)

This invention relates to a walking aid for the sightless or partially blind.

Apart from "Seeing Eye" dogs, which are most costly to train, aids to the sightless or partially blind at present employed do not provide a great degree of assistance to the blind, particularly when walking over strange terrain or surroundings since such aids provide little advance information to the user.

The principal object of the present invention is to provide a walking aid for the sightless or partially blind which will indicate to the user advance information of the contour of the ground being negotiated by the user, and which will be simple and economical in construction.

With the above-stated object in view, a walking aid for the blind or partially blind includes a main member supported on a ground engaging wheel, said wheel and member being adapted to be propelled by and in advance of the user, a ground engageable member trailing said wheel and fixed to said main member, a slidable mounting for said wheel adapted to permit the wheel to rise and fall in advance of the trailing ground engageable member, and with means connected to and movable in response to the ground wheel, said means being adapted to contact the arm of the user to indicate movement of said ground wheel.

In the arrangement stated the trailing ground engageable member supports the main member at normal ground level when the ground wheel drops to follow the ground contour in advance of the trailing member whereby the user is warned in advance of any fall or drop in ground level.

In one arrangement the main member comprises a tube having a rod or tube telescopically slidable in one end thereof, the free end of said rod or tube carrying the ground engaging wheel, a ground engageable foot or shoe trailing said wheel and fixed to the main tube, the upper end of the said main tube constituting a handle for the user, and a second telescopic rod or tube projecting from the handle end and connected to the wheel carrying tube to move in response thereto, and with the free end of the second telescopic rod or tube carrying a wheel adapted to contact and move on the arm of the user.

In order that the invention may be more readily understood reference will now be made to the accompanying drawings illustrating one practical embodiment of a walking aid for the blind or partially blind constructed in accordance with the present invention. In these drawings.

Figure 1:
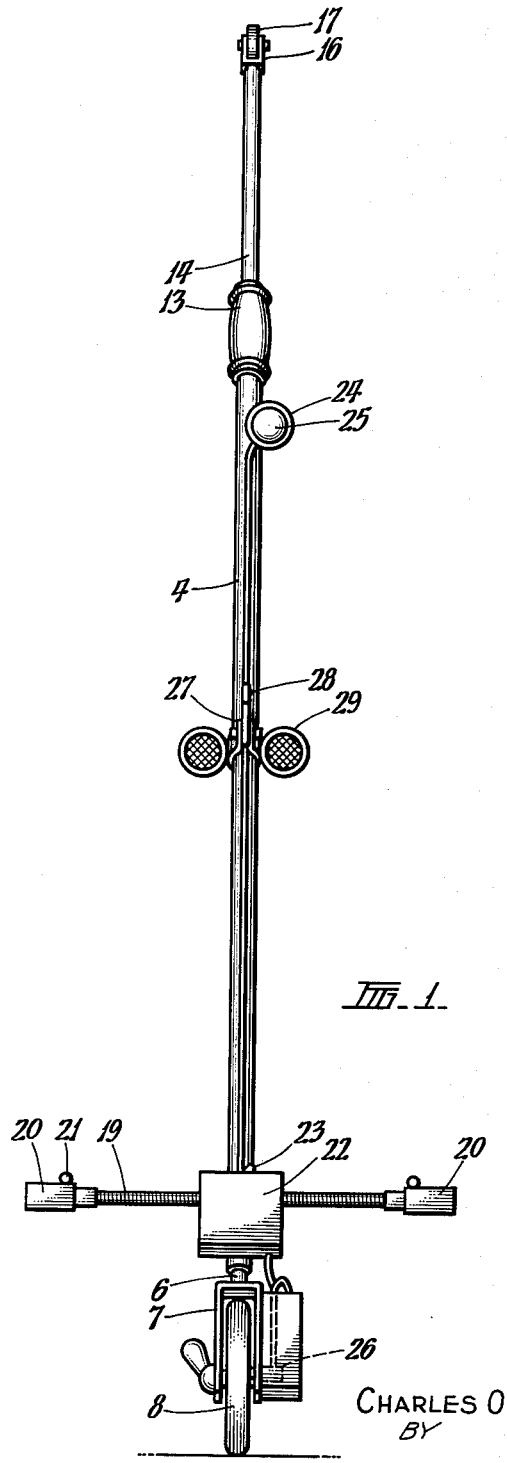
FIG. 1 is a front elevation of the walking aid.
Figure 2:
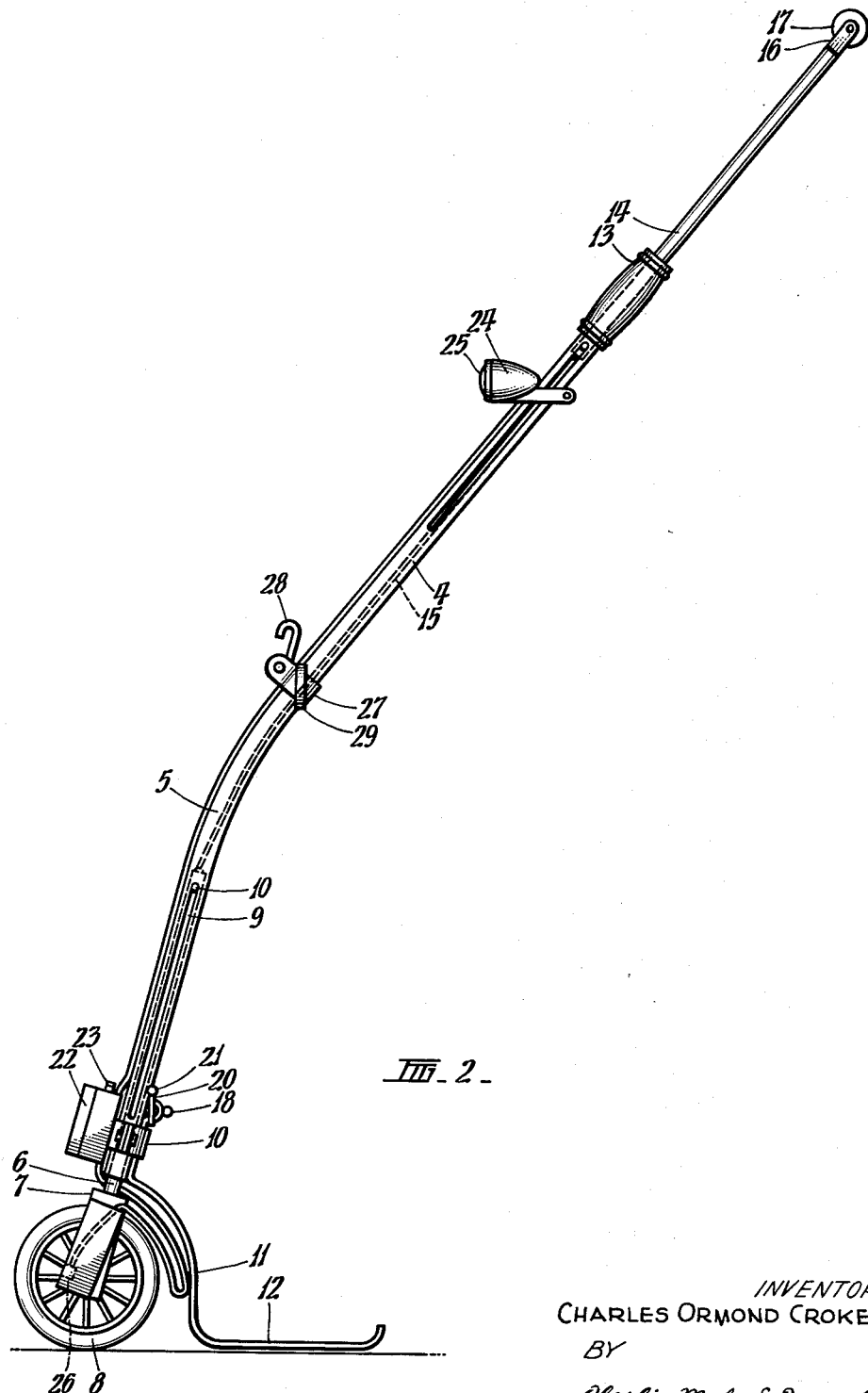
FIG. 2 is a side elevation thereof.
Figure 3:
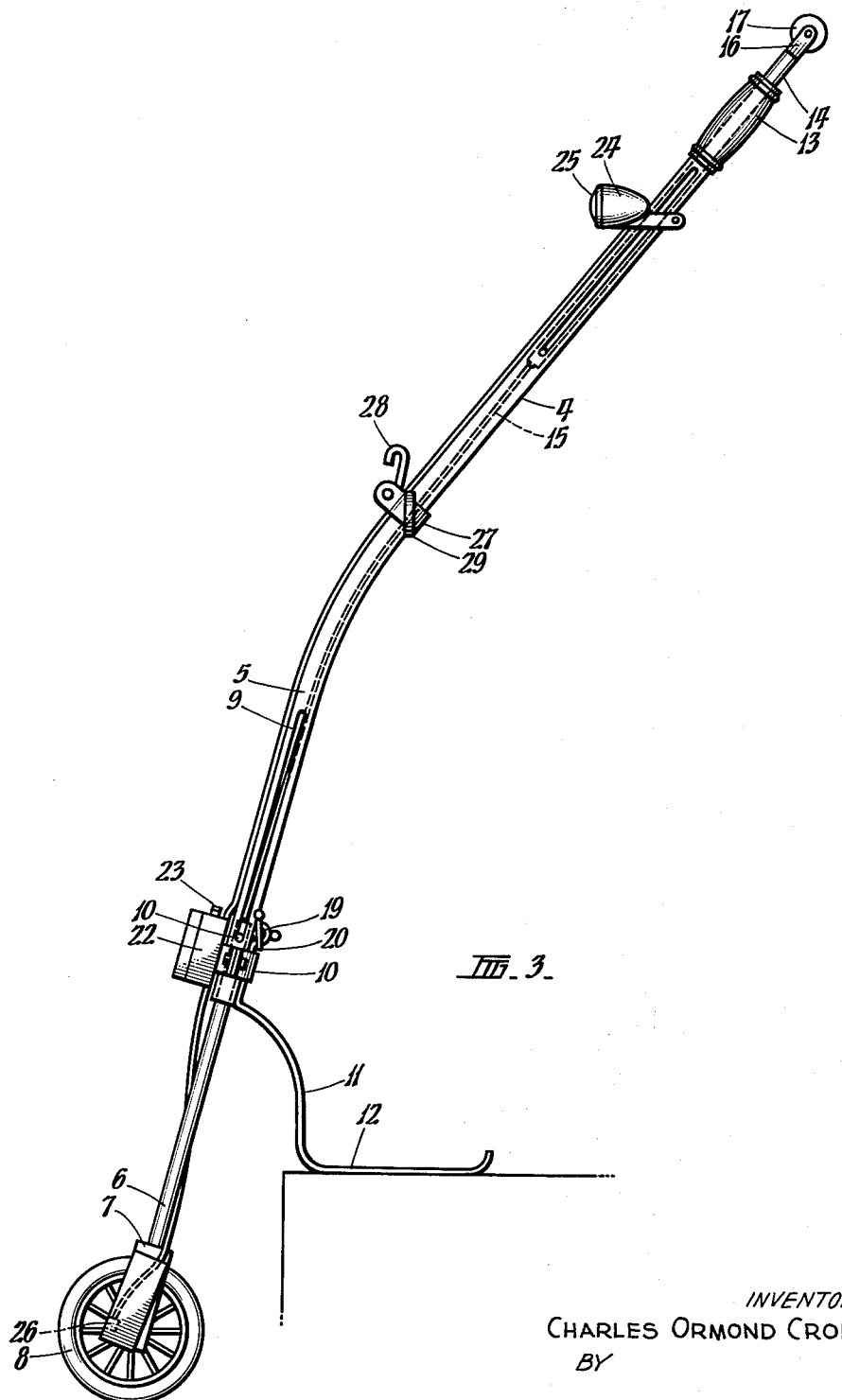
FIG. 3 is a view in side elevation of the walking aid supported on the trailing foot or shoe and the ground wheel in the lowered position past a curbstone or step.

As illustrated in the drawings, the walking aid comprises a main member 4 consisting of a tube slightly curved at 5 in the center thereof and having at the lower end a second tube 6 telescopically and freely slidable therein, the outer or free end of which has a fork 7 fixed thereto and in which is rotatably supported a rubber or like tired wheel 8.

The main tube 4 is slotted at 9 on one side thereof to receive a pin 10 fixed to the inner end of the telescopic tube 6 to limit the movement of tube 6 in the main tube 4. At the lower end of the main tube 4 is a clamp bracket 10 having formed thereon an arm 11 on the end of which is formed a foot or shoe 12 arranged to trail the ground wheel 8 and is adapted in the normal position to be positioned close to and just above normal ground level as the walking aid is propelled in advance of the user.

The upper end of the main tube 4 has mounted thereon a rubber hand grip 13 and is arranged at such a height and inclination by reason of the curve 5 in the tube 4 that the tube and wheel 8 may be propelled in advance of the user by one hand with the foot or shoe 12 just above normal ground level and clear of the footsteps of the user.

Freely slidable in the upper end of the main tube 4 is a second telescopic tube 14, the inner end of which is connected by a steel wire 15 to the inner end of the other telescopic tube 6 so that corresponding movement of the tube 6 is imparted to the tube 14.

The tube 14 at the outer end thereof is provided with a fork formation 16 in which is rotatably mounted a small rubber or like resilient wheel 17. The tube 14 is adapted to be accommodated in the arm sleeve of the user so that the wheel 17 contacts the arm of the user and any movement of the wheel fork tube 6 is indicated on the arm of the user by the movement of wheel 17.

Formed in the clamp bracket 10 is a loop or eye 18 in which is slidably received a flexible arm 19 which may be in the form of a coil spring and arranged to extend transversely on each side of the main tube 4. At the ends of the flexible arm 19 are fixed fingers or plates 20 and with which are included miniature bells 21 arranged to sound when the fingers or plates 20 contact any object encountered on either side of the main tube 4 and wheel 8. The arm 19 is of such a length that the fingers or plates 20 extend about 8 inches on each side of the clamp bracket 10, although the arm 19 may be moved in the loop or eye 18 to extend more on one side than the other so that constant contact with a wall or fence, along which the user is walking, may be maintained and during which time one of the bells 21 will sound, and any breaks in the wall or fence will be indicated by silencing of the bell.

Also fixed to the clamp bracket 10 is a battery box 22 which is adapted to enclose one or more dry batteries which are connected through a switch 23 on the box 22 to a warning lamp 24 fixed to the upper part of the main tube 4, said lamp 24 having an amber or red coloured lens 25 therein. The energizing circuit of the lamp 24 includes a make and break switch 26 mounted on the wheel fork 7, said switch 26 to be actuated by the spokes or projections on the wheel 8 so that a flashing or intermittent light is given by the lamp 24 as the aid is propelled by the user. An electric blinker of known kind may be included in the lamp circuit or the make and break switch could be operated by a simple clock-mechanism.

A clamp bracket 27 may also be provided on the tube 4 and which includes a suspension hook 28 for hanging the aid when not in use. The bracket 27 also provides a mounting for one or more warning light reflectors 29. It is preferred that a suitable clamp or catch (not shown) be provided on the handle end of tube 4 and arranged to retain the tube 14 in position when the aid is hung or suspended by hook 28 so that the wheel fork tube 6 does not assume its fully extended position.

In use the walking aid is held in one hand by the user by the hand grip 13 with the tube and wheel 17 extending up the user's sleeve so that the wheel 17 contacts the user's arm and the wheel 8 propelled in advance of the user. Upon the wheel 8 being advanced over a step or curb, for example, the aid is then supported by the foot or shoe 12 and the wheel 8 drops down to the next step or foot of the curb and a corresponding movement is imparted to the tube 14 and wheel 17 so that the user is advised in advance of the step or curb and the depth of the step or curb. In a similar manner any other irregularities of the terrain or pavement are indicated to the user.

The arm 19 and bells 21 thereon also indicate side obstacles to the user, and as above described, the arm 19 may be employed or moved to one side to contact a wall or fence and any breaks in the wall or fence are indicated by siliencing of the bell carried on the arm.

At night the warning lamp 24 may be energised, and with the lamp and reflectors 29 the user could safely negotiate street crossings.

It will be apparent that various improvements or modifications may be made in the construction above described in that the trailing foot or shoe 12 may be in the form of a wheel.

I claim:

1. A walking aid for the blind or partially blind including a main member, a ground engaging wheel, means mounting said wheel on said main member for relative sliding movement therebetween, said wheel and main member being adapted to be propelled by and in advance of the user, ground engageable means fixed to said main member and trailing said wheel for supporting said main member at a particular ground level while permitting said wheel to rise and fall in advance of the trailing ground engageable means, and means connected to and moveable in response to movements of said ground engaging wheel, said last-mentioned means being adapted to contact the arm of the user to indicate such movements of said ground engaging wheel.

2. A walking aid for the blind or partially blind including a main member, a ground engaging wheel supporting said main member, said wheel and main member being adapted to be propelled by and in advance of the user, a ground engageable member fixed to said main member to trail said wheel and supported close to normal ground level, means mounting said wheel for sliding movement with respect to said main member and ground engageable member to permit said wheel to fall in advance of said trailing ground engageable member while said main member is supported at normal ground level by said ground engageable member, and means connected to and moveable in response to such falling of said ground engaging wheel, said means being adapted to contact the arm of the user to indicate such movement of said ground engaging wheel.

3. A walking aid for the blind or partially blind including a main tube member, a ground engaging wheel supporting one end of said main tube member, a first tube telescopically and freely slidable in said end of said main tube member and carrying said wheel, said wheel and main tube member being adapted to be propelled by and in advance of the user, a ground engageable member fixed to said main tube member to trail said wheel and adapted to support said main tube member upon said wheel falling to follow a lower than normal ground level in advance of the trailing member, a second telescopically slidable tube in the other end of said main tube member connected to and movable in response to movements of said first telescopic tube, and with the outer end of the second slidable tube adapted to contact the arm of the user.

4. A walking aid for the blind or partially blind including a main tube member, a first tube freely and telescopically slidable in one end thereof, a ground wheel mounted on the outer end of the first telescopic tube to support the main tube member to permit the wheel and main tube member to be propelled by and in advance of the user, a foot or shoe fixed to the main tube member and arranged to trail the said wheel close or adjacent to normal ground level so as to support the main tube member upon the wheel falling to follow a lower than normal ground level in advance of the foot or shoe, a second tube telescopically slidable in the other end of the main tube member, a wire connection within the main tube member to connect the two telescopic tubes together, and with means on the outer end of the second telescopic tube to contact the arm of the user to indicate falling movement of the ground wheel.

5. A walking aid for the blind or partially blind including a main tube, a first tube telescopically and freely slidable in one end thereof, a ground wheel on the free end of said first telescopic tube and adapted to support the main tube and permit the latter to be propelled by and in advance of the user, a ground engageable foot or shoe trailing said wheel and fixed to the main tube, the other or upper end of the main tube constituting a handle for the user, a second telescopic tube projecting from the handle end of the main tube, a connection coupling the second telescopic tube to the wheel carrying first telescopic tube so that movement of the first tube effects corresponding movement to the second tube, and with the free end of the second telescopic tube carrying a wheel adapted to contact and move on the arm of the user.

6. A walking aid for the blind or partially blind as claimed in claim 5 and wherein a transverse flexible arm is attached to the lower end of the main tube so as to extend on each side of the main tube, said flexible arm carrying miniature bells adapted to sound upon the ends of said arm contacting side obstacles to the user.

7. A walking aid for the blind or partially blind as claimed in claim 5 and wherein the main tube carries a warning lamp energized by a battery supported on said tube.

8. A walking aid for the blind or partially blind as claimed in claim 5 and wherein the main tube carries a warning lamp enerized by a battery supported on said tube, and with a make and break switch in said lamp circuit to impart a flashing or blinking illumination of said lamp.

9. A walking aid for the blind or partially blind as claimed in claim 5 wherein the main tube carries a warning tube energized by a battery supported on said tube, a make and break switch in said lamp circuit, and with said switch actuated by the ground wheel to impart a flashing or blinking illumination to said lamp.

References Cited by the Examiner

UNITED STATES PATENTS

| 2,198,082 | 4/1940 | Harty | 135—47 X |
| 2,283,442 | 5/1942 | James | 240—7.55 X |
| 2,683,461 | 7/1954 | Kinney | 135—63 X |
| 3,158,162 | 11/1964 | Reel | 135—47 |
| 3,158,851 | 11/1964 | Ruthven | 135—63 X |

FOREIGN PATENTS 327,881   11/1919   Germany.

HARRISON R. MOSELEY, *Primary Examiner.*

REINALDO P. MACHADO, *Examiner.*

L. J. SANTISI, *Assistant Examiner.*